Jan. 4, 1955 B. G. DAMMERS ET AL 2,698,897
SUPERHETERODYNE RECEIVING CIRCUIT
Filed June 28, 1952
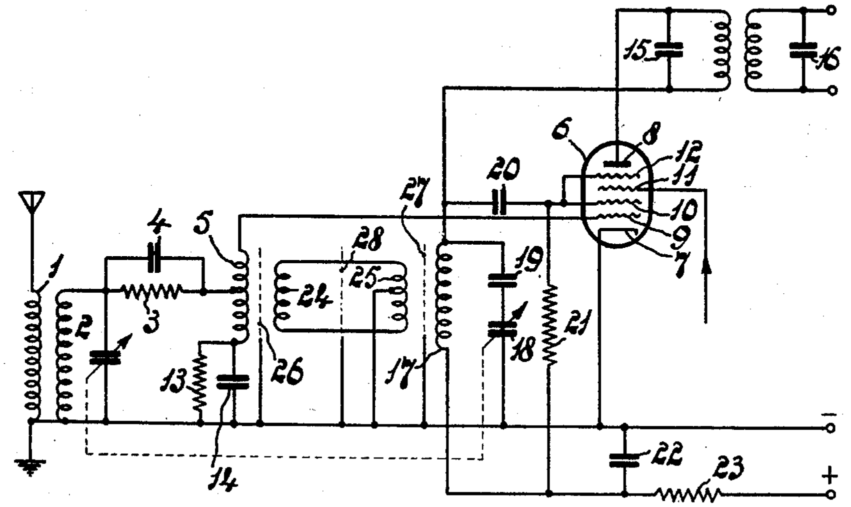
INVENTORS
Bernhardus Gerhardus Dammers
Abraham Gertrudas Wilhelmus Uitjens
BY Fred M Vogel
AGENT

United States Patent Office 2,698,897

Patented Jan. 4, 1955

2,698,897

SUPERHETERODYNE RECEIVING CIRCUIT

Bernhardus Gerhardus Dammers and Abraham Gertrudas Wilhelmus Uitjens, Eindhoven, Netherlands, assignors to Hartford National Bank and Trust Company, Hartford, Conn., as trustee Application June 28, 1952, Serial No. 296,214

Claims priority, application Netherlands July 2, 1951

7 Claims. (Cl. 250—20)

This invention relates to superheterodyne receiving circuits in which frequency conversion is effected by a tube acting both as a mixing tube and as a local oscillator, an inductive coupling being provided for the latter purpose between an impedance included in the circuit of a current-conveying electrode of the tube, as a rule the circuit tuned to the local-oscillator frequency, and a feed-back coil included in the circuit of a control grid of the tube, and the incoming signal oscillations also being active at the said control grid.

In such "additive mixing" circuits in which the local oscillation and the incoming oscillation are active at the same grid of the mixing tube, unwanted coupling frequently exists between the circuit or circuits in which the local oscillations are produced and the aerial circuit, as a result of which an impermissibly-strong emission of oscillations of the local-oscillation frequency occurs. It has been suggested to obviate the said disadvantage by connecting a tapping of the aerial circuit, preferably the centre thereof, to a point, preferably the centre, of the feed-back coil and by earthing that extremity of the feed-back coil which is not connected to the control grid of the mixing tube by way of a condenser. If the cathode of the mixing tube also has earth potential, a bridge circuit ensues which is constituted by the two parts of the feed-back coil, the said condenser and the grid-cathode capacity of the mixing tube, and one diagonal of the bridge receives the incoming oscillations occurring across the aerial circuit. By suitable proportioning of the branches of the bridge it can theoretically be ensured that the oscillator voltage across this diagonal is zero. In practice, however, the voltage of oscillator frequency at the tapping point of the feed-back coil invariably has a fairly considerable value, even if provision is made of a screen between the feed-back coil and the coil of the tuned circuit in which the local oscillation is produced. This is attributable to the excessive capacity between the coupling coil and the said tuning coil and the unilateral connection of the latter to earth. The symmetrical circuit of the feed-back coil is capacitatively coupled to the asymmetric connection of the tuning circuit and the mixing tube, so that the symmetry of the bridge is disturbed.

The object of the invention is to design a superheterodyne receiving circuit of the above-described kind in such manner that the emission of the local oscillations by the aerial may readily be decreased to below the permissible limit whilst nevertheless obtaining a highly satisfactory oscillator action and a reasonable conversion slope.

According to the invention, in a frequency-transformation circuit in which one tube acts both as a mixing tube and as a local oscillator, an inductive coupling being provided for this latter purpose between an impedance included in the circuit of a current-carrying electrode of the tube, preferably a circuit tuned to the local-oscillator frequency, and a feed-back coil included in the circuit of a control grid of the tube, and the incoming signal oscillations being supplied by way of a tapping of the feed-back coil to the said control grid, the feed-back takes place by way of an intermediate coupling circuit comprising two inductances which are coupled to the said impedance and to the said feed-back coil respectively, a tapping point of at least one of the two said inductances being connected to a point of constant potential.

By the use of such an intermediate coupling circuit it may readily be ensured that the parasitic capacities between the two parts of the feed-back coil and the coil of the intermediate circuit which is connected therewith are approximately the same, so that the circuit of the feed-back coil may be rendered substantially symmetrical.

Although an intermediate circuit will, as a rule, cause a decrease of the effective coupling between the circuit in which the local oscillations occur and the feed-back coil, it has nevertheless been found, that, at least when the invention is used in the range of medium waves, a sufficient oscillator voltage at the control grid of the mixing tube and a satisfactory conversion slope are obtainable. This end is facilitated when use is made of a mixing tube having a screen grid and the anode and the screen grid both constitute oscillator electrodes. When such a circuit is used, it is furthermore readily possible to obtain gain control, for example with the use of a direct voltage proportional to the amplitude of the intermediate-frequency carrier-wave, if an additional control-grid is provided between the screen grid and the anode, to which the control voltage may be supplied.

In order that the invention may be more readily understood it will now be described in greater detail with reference to the accompanying drawing showing, by way of example, one embodiment thereof.

In the drawing, reference numeral 1 indicates an aerial circuit which is inductively coupled to an input circuit 2 tunable to the incoming signal frequency. One extremity of circuit 2 is connected to earth and the other is connected by way of the parallel combination of a resistor 3 and a condenser 4 to a point, preferably the centre, of a coil 5. One extremity of coil 5 is connected to a first control grid 9 of a mixing tube 6 and the other is connected to earth by way of the parallel combination of a resistor 13 and a condenser 14. The coil 5 serves as a feed-back coil and for this purpose is coupled as hereinafter described to an inductance 17 in a circuit 17, 18, 19 which is tuned to the local-oscillator frequency. The variable condenser 18 in this circuit is mechanically coupled, as is common practice, to the tuning condenser of the circuit 2. The other condenser 19, which is fixed or semi-variable, is a padding condenser ensuring a substantially constant frequency difference between the input circuit 2 and the oscillator circuit. The latter is connected in series with a circuit 15 which is tuned to the intermediate frequency and which is inductively coupled to a circuit 16 likewise tuned to the intermediate frequency, circuits 15 and 16 constituting a band-pass filter. The lower end of the coil 17 is connected to earth for high-frequency by way of a condenser 22 and, by way of a resistor 23, to a source of supply voltage for the anode 8 of the tube 6.

Due to the coupling between the coil 5 and the coil 17, oscillations of local-oscillator frequency occur in the circuit 17, 18, 19, and these are also active at the control grid 9 of the tube and thus, in conjunction with the incoming signal oscillations supplied by way of the coil 5, lead to the occurrence of oscillations of intermediate frequency in the circuits 15 and 16. The resistor 3 and the condenser 4 are to regarded as a grid-leak resistance and a grid condenser respectively for the oscillator. Said elements are included in a diagonal of the bridge circuit now to be described and thus do not disturb the symmetry thereof.

It is in order to prevent or reduce emission of the local oscillations by the aerial that the upper end of the input circuit 2 is connected to the coil 5 as shown whereby a bridge circuit is formed constituted by the two halves of coil 5, the grid-cathode admittance of the tube 6 and the parallel combination of resistor 13 and condenser 14. The latter combination is chosen to be equivalent to the input admittance of the tube 6. If the condition for equilibrium of the bridge is to be fulfilled, the oscillator voltage at the centre of the coil 5 will theoretically have to be zero. In practice it is found, however, that such a condition does not arise in the absence of the invention since the parasitic capacities disturb the equilibrium of the bridge in the case of direct inductive coupling between the coil 5 and the coil 17 of the oscillator circuit.

According to the invention, in order to remove or reduce this effect, the coil 5 is not directly coupled to the coil 17 but is coupled thereto by way of an intermediate circuit comprising two inductances 24 and 25 in series, one of said inductances being inductively coupled to the coil 5 and the other to the coil 17. A point, preferably the centre, of the inductance 25 is connected to earth. If necessary, screens 26, 27 and 28 may be provided between the various windings.

In this manner it is ensured that the parasitic capacities between the two halves of the coil 5 and the surroundings are substantially the same, so that the bridge circuit may readily be brought into equilibrium.

The intermediate coupling circuit 24, 25 causes a decrease of the effective inductive coupling between the grid circuit of the mixing tube and the circuit tuned to the oscillator frequency. However, it is still possible to obtain an oscillator voltage of sufficient value at the control grid and hence a satisfactory conversion slope and this is facilitated by employing a multi-grid mixing tube in the manner shown in the drawing. In addition to the electrodes already described, the tube 6 comprises two interconnected screen grids 10 and 12 and a second control grid 11, which here serves for gain control purposes. The two screen grids 10 and 12 are connected by way of a resistor 21 of high ohmic value of the positive terminal of the source of supply and by way of a condenser 20 to the upper end of the oscillator circuit 17, 18, 19. Consequently, voltages of oscillator frequency are active at the said screen grids, which voltages are in phase with the voltage at the anode 8. The screen grids 10, 12 and the anode 8 are thus all active as oscillator electrodes. A sufficient mutual conductance of the control grid 9 with respect to the positively-biased electrodes is thus obtained, so that by suitable proportioning of the intermediate circuit 24, 25 it is readily possible to produce local oscillations of the desired strength.

The grid 11, in the absence of signals, has a voltage which is substantially equal to the cathode voltage or is at the most slightly positive thereto. During operation grid 11 receives a direct voltage for A. G. C. purposes which is derived in the usual manner and which is proportional to the amplitude of the intermediate-frequency carrier wave, so that the tube 6 also serves for automatic volume-control of the output signal. This control affects only slightly the amplitude of the local oscillation set up at the control-grid 9, since the grid 11 acts as a distribution grid and does not substantially influence the total current emitted by the cathode. An increase in the negative bias of the grid 11 will only result in a decrease of the current flowing to the anode and hence of the intermediate-frequency voltage at the anode, whereas the current flowing to the screen grids 10 and 12 increases.

Instead of connecting the centre of the inductance 25 to earth, it is alternatively possible for the centre of the inductance 24 or for both centres to be connected to earth.

Each of the coils 24 and 25 may have from 15 to 30 turns when tuned to the medium-wave range.

What we claim is:

1. In a superheterodyne receiving circuit, apparatus for effecting frequency conversion comprising an electron discharge device having a current-carrying electrode and a control grid and circuits therefor, an impedance tuned to a local oscillator frequency and coupled to said current-carrying electrode, a feedback coil having a tap thereon included in the control grid circuit, means for applying incoming signal oscillations to said tap, and an intermediate feed-back coupling circuit comprising two inductances having a tap thereon coupled to said impedance and to said feed-back coil, the tap on one of said two inductances being connected to a point of constant potential.

2. Conversion apparatus, as set forth in claim 1, wherein said incoming oscillations are applied to the center of said feed-back coil and wherein the center of one of said inductances is connected to ground.

3. Conversion apparatus, as set forth in claim 1, further including a parallel combination of a resistor and a capacitor, and wherein one end of said feed-back coil is connected to the control grid of said discharge device and the other end of said coil is connected to a point of constant potential through said parallel combination.

4. Conversion apparatus, as set forth in claim 1, wherein said means for applying incoming signal oscillations includes a parallel combination of a resistor and a capacitor connected to the tap on said feed-back coil.

5. Conversion apparatus, as set forth in claim 1, wherein said electron discharge device further includes a screen grid and wherein said cicuit tuned to the local oscillator frequency includes the common circuit of said screen grid and said current-carrying electrode.

6. Conversion apparatus, as set forth in claim 5, further including a circuit tuned to the intermediate frequency and wherein the circuit tuned to the intermediate frequency and the circuit tuned to the local oscillator frequency are connected in series between said current-carrying electrode and the positive terminal of a supply source, the common of said tuned circuits being connected to said screen grid.

7. Conversion apparatus, as set forth in claim 5, wherein said electron discharge device further includes an additional grid for receiving a direct voltage which is dependent upon the amplitude of the intermediate-frequency carrier wave, said additional grid being interposed between said current-carrying electrode and said screen grid.

References Cited in the file of this patent

UNITED STATES PATENTS

| | | |
|---|---|---|
| 1,560,854 | Pressley | Nov. 10, 1925 |
| 1,642,173 | Round | Sept. 13, 1927 |
| 1,740,331 | Carlson | Dec. 17, 1929 |
| 1,863,564 | Chretien | June 21, 1932 |
| 2,053,414 | Barden | Sept. 8, 1936 |